May 22, 1962  R. G. LEGROS  3,035,459
AUTOMATIC VARIABLE RATIO TRANSMISSION DEVICE
FOR VEHICLES AND OTHER APPLICATIONS
Filed May 28, 1959  3 Sheets-Sheet 1

INVENTOR
R. G. Legros
By Holcomb, Wethrill & Brisebois
ATTORNEYS

INVENTOR
R. G. Legros

ATTORNEYS

000000000000000000000000000# United States Patent Office 3,035,459
Patented May 22, 1962

3,035,459
AUTOMATIC VARIABLE RATIO TRANSMISSION DEVICE FOR VEHICLES AND OTHER APPLICATIONS
Robert Guy Legros, 43 Rue des Chappelles,
Sevres, France
Filed May 28, 1959, Ser. No. 816,552
Claims priority, application France May 31, 1958
14 Claims. (Cl. 74—796)

The present invention relates to a mechanical variable speed transmission of known type, wherein several frusto-conical rollers are moved along a hypocycloidal path with the shafts thereof inclined so that said rollers envelop a cylinder at their peripheries, and a circular annulus or ring defining a portion of such cylinder is adapted to be moved axially so as to be frictionally driven by the rollers at a speed which may vary continuously according to the position of said annulus and which may even become zero and reverse its direction if the axis of instantaneous rotation of the rollers extends through the surface thereof at a point within the range of movement of the annulus.

It is also known to obtain the hypocycloidal conical movement of said rollers by means of gear elements or other conical epicyclicoidal rollers which roll upon the internal surface of a fixed annulus or ring and are driven by a gear element or conical sun roller, such additional planetary rollers rotatively meshing with the main rollers and their common shafts being carried in an idling planet carrier on the shaft of the sun element.

In the case where such movement is in turn obtained frictionally, it is also known, as described and shown in the U.S. patent application 786,815, now abandoned, to balance the axial thrusts by means of a set of levers or rocking shafts, acting on the sun roller member, the recited annulus and the planetary carrier by means of rotating seals.

According to the aforesaid application, it is further known to compensate the centrifugal force effect upon the secondary planetary rollers by means of a set of levers provided with centrifugal weights, which insures also a compensation of the play resulting from wear, the main rollers remaining conversely acted upon by the centrifugal forces, which provides the normal force allowing the friction. In such a known type of transmission, the maximum available torque is then a direct function of the square of the input shaft speed.

The present invention has for its object improvements to such a kind of transmission, particularly in order to render the same usable in an automobile and to allow its automatic control.

The present invention is characterized by the provision of a particular mechanical organization combined with a servoing device, which both cause at every moment the maximum torque transferable by said device to be no longer a function of the square of the input shaft speed but instead of the actual torque available at the driving wheels which is in turn a function of the engine speed, the throttle opening and the instantaneous transmission ratio. Said servoing is obtained, preferably, by a hydraulic device and thus allows the adjustment at every moment of the frictional forces to no more than the necessary minimum for the transmission, so as to have the maximum transmission output irrespective of the engine speed and with a positive automatic working. Owing to an ultimate improvement, the device according to this invention makes possible an entirely automatic control of the vehicle with the aid of only the two accelerator and brake foot pedals to which, preferably, will be added a third foot pedal which, if used, permits the adjustment of the servoing functions, in order to adopt a sporting drive using high engine speed during accelerations as well as when using the engine as a brake.

For a better understanding of this invention there will now be described the preferred form thereof with reference to the annexed drawings which show the servoing device, said preferred form being given in an illustrative and by no means limiting manner.

Figure 1:
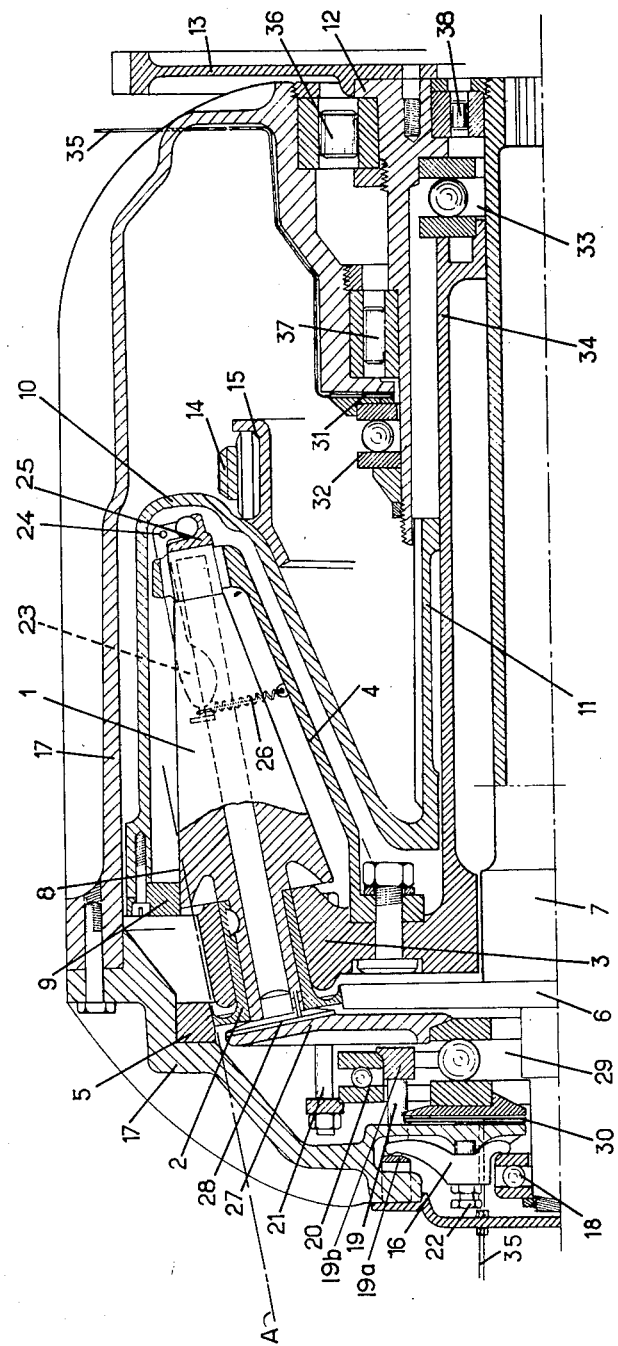
FIG. 1 is a longitudinal section of the variable speed transmission proper.

There can be seen in FIG. 1 that the variable speed transmission according to this invention comprises, as above-mentioned, a set of main conical rollers such as roller 1, which are each integral with a secondary roller 2, each of these sets of rollers being rotatably mounted in two bearings supported by a planet carrier made in two parts 3 and 4. Said secondary rollers 2 roll on the inner periphery of a fixed annulus or ring 5 provided with a conical bearing surface, thus moving with a hypocycloidal movement, such movement being imparted by a sun roller 6 integral with an input shaft 7. At every moment, the sets 1—2 have an instantaneous axis of rotation A extending through the contact point of 2 upon 5 converging towards the point at which the axes of rollers 1 and shaft 7 meet and extending beyond the surface of the roller 1 at a point 8. A circular ring or annulus 9 comes into contact simultaneously with all the rollers 1 and is adapted to move along the axis of shaft 7. The angle between the axis of the roller 1 and the axis of shaft 7 has a value equal to the half of the apex angle of the cone of roller 1, so that the rollers 1 envelop at the periphery thereof a cylinder coaxial with shaft 7. Under such conditions, when moving axially, the ring 9 is constantly in contact with said rollers. It is evident that if the ring 9 comes into contact with the rollers 1 at the point 8, said ring will remain stationary irrespective of the rotation speed of the input shaft 7. Conversely, if the ring 9 is moved by some distance towards the smaller bases of the cones 1, the ratio between the speed of ring 9 and that of the input shaft 7 will increase in proportion to such distance. Also, if starting from the position 8 the ring 9 is moved by some distance towards the larger bases of the cones 1, the ratio between the speed of the ring 9 and that of the input shaft 7 will increase in proportion to such distance, but in that case the ring will rotate in a reverse direction relative to the input shaft. There is thus obtained a continuous variable speed transmission which moreover provides a neutral condition and reverse speed. In order to transmit the movement, said ring 9 is integral with a revolving member 10 which terminates at its centre in a splined member 11 which in turn transmits the movement to an element 12 integral with a toothed wheel 13. Moreover, in view of an axial sliding of the parts 9, 10 and 11, a fork-shaped lever 14, which supports rollers at the end thereof, acts upon a member 15 provided with a circular groove and integral with said part 10.

Several levers 16 (such as, for example, 3) pivotedly mounted on a casing 17 act by their central ends on a thrust ball bearing 18 which transmits their axial force to the planetary roller 6 through the shaft 7. The outer ends of said levers 16 act through two rings 19a and 19b which are connected by pins 19 which are axially slidable within the casing, with ring 19b bearing on another thrust ball bearing 20, which transmits, by means of other pins 21, the axial thrust to the planetary carrier 3—4. The lengths of the arms of said levers 16 are determined so as to balance the axial components of the mutual reaction of the rollers 2 upon the ring 5 and planetary roller 6, on the one hand, and of the set 1—2 upon the bearings of the planetary carrier 3—4 and ring 9, on the other hand. Each of the levers 16 is provided with an adjusting member 22 adapted to adjust the contact pressure of the planetary rollers 2 upon the ring 5 and the planetary roller 6, said levers having moreover a degree of flexibility or being provided with resilient members at least at one of their three pivot points so that the adjusted pressure is maintained in spite of the wear of the parts.

Owing to the slope of the axes of the sets 1 and 2, the centrifugal forces tend to cause the rollers 1 to apply a pressure upon the ring 9 which increases according to the square of the speed of the input shaft 7; thus, the torque which the rollers 1 are capable of applying on the ring 9 is too low when the engine operates at low speeds and, on the contrary, becomes too high when said engine approaches its maximum speed. In order to compensate for this centrifugal effect, the planet carrier is provided with a set of levers 23 carrying centrifugal weights, and pivotedly mounted at 24 and transferring their thrust at the end of roller 1 through a stop member 25. As the weighted end of the levers (the left end as seen in FIGURE 1) is forced away from the shaft by centrifugal force, the right end is swung about its mounting pin 24 and forced to the left thus urging the stop member 25 against the conical roller 1. Such centrifugal weights are calculated so as to compensate exactly for the centrifugal force effect upon the sets 1—2. However, said levers 23 are provided with an opposing spring 26 applying a nearly constant force and rated so that below a certain speed the centrifugal weights do not act upon said stops 25. Conversely, above said speed, the levers 23 operate, but their compensating effort is lessened by a constant quantity.

In order to increase the transmitting torque at low speeds, the transmission is completed, according to the present invention, by a device comprising a plate or disc 27 which acts upon the other end of the shafts of the rollers 1 through stops 28 and having clearances for admitting the pins 21. The plate 27 receives, through a thrust ball bearing 29, an axial thrust applied by an oil pressure annular cup 30. At the same time, so as to avoid to unbalance the assembly and allow the levers 16 to operate, a second cup 31, which applies an axial thrust constantly equal to that of the first cup 30, transmits through a thrust ball bearing 32, a force to said member 12, which in turn transmits, through another thrust ball bearing 33, said force to the end of a tubular part 34 extending from said part 3. It can be seen easily that the combined action of the cups 30 and 31 results in an increase of the pressure applied by the rollers 1 upon the ring 9, the whole of the parts remaining nevertheless balanced. In order to insure constant thrust of the cups 30 and 31 the latter are given an effective equal section and they are fed by the same oil pressure through two conduits 35 connected together.

To complete the structure, it can be seen in FIG. 1 that the member 12 is journalled in the casing by means of two roller bearings 36 and 37, the end of the shaft 7 being itself journalled in member 12 by means of a roller bearing 38. The central part 11 of the member 10 is rotatably mounted by the end thereof on the part 34 of member 3, which is also rotatably mounted by the other end thereof on shaft 7. At the other end, the parts 10, 3 and 7, respectively, are centered by the frustoconical rollers 1 and 2 themselves.

The preceding organization contemplates that the toothed wheel 13 meshes directly with the differential, the engine and the variable speed transmission being disposed on opposite sides of this differential. Of course, it would be also possible to extend the end of shaft 7 on the left hand side of the drawing without substantial modification of the device.

Figure 2:
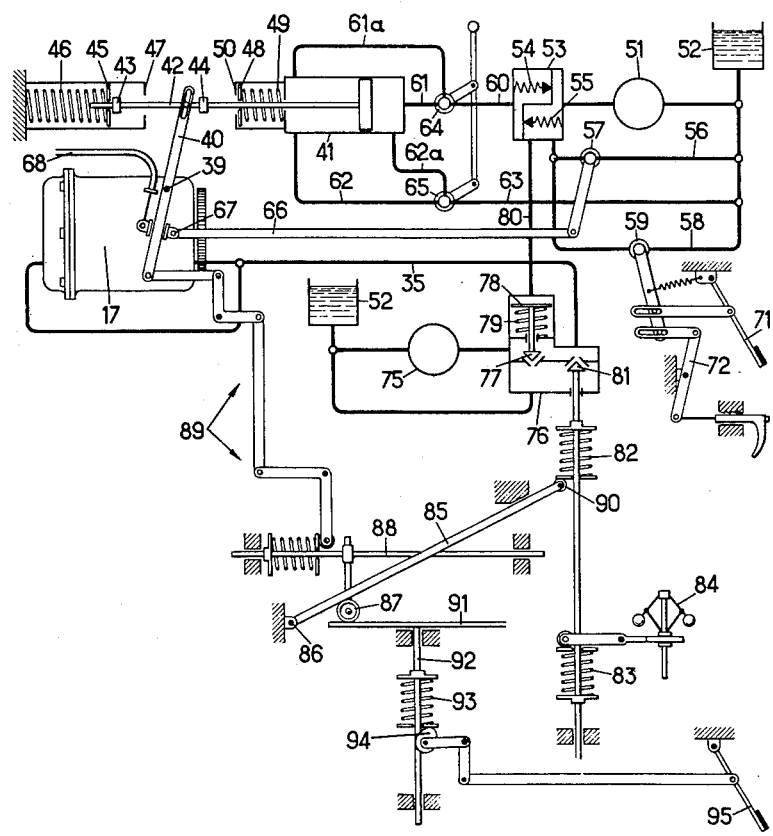
FIG. 2 is a general schematic view of the servoing device.

FIG. 2 shows the general schematic organization for controlling the device, the aforementioned variable speed transmission being represented at 17 and shown from above. The recited fork 14 of this variable speed transmission is integral with a pin 39 actuated by a lever 40. Said lever 40 is in turn operated by a double acting oil jack 41, the rod 42 of which is provided with two blocks 43 and 44. The block 43 acts upon a washer 45 which compresses a spring 46 enclosed in a housing having a shoulder 47. When at rest, the springs expand until the washer 45 bears on the shoulder 47. At this moment, the block 43 is at the level of said shoulder and is no longer subjected to any force. When the jack operates and compresses the spring 46, the latter applies a force which is approximately porportional to the displacement. On the other side, the block 44 acts also upon a washer 48 and upon a spring 49 which supplies also a force proportional to the displacement and which moves also to bear upon a shoulder 50 when in a rest position, said rest position corresponding to the rest position of the spring 46 and also to the position of the lever 40 which sets the variable speed transmission into the neutral condition.

To operate said jack a positive displacement or other suitable gear pump 51 driven by the vehicle engine pumps oil from a tank 52 and pumps it into a valve housing 53 which comprises two valves 54 and 55 which are each reset on their seats by a calibrated spring. The oil flows back by a pipe 56 through a valve 57 and also by a pipe 58 through a valve 59.

The valve housing 53 feeds the jack 41 by means of a conduit means 60—61, when the oil pressure exceeds the level as determined by the calibration of the spring of valve 54; the back flow of the oil discharged by the other face of the jack piston is through a conduit means 62—63 which lead back the oil into the tank 52. When the oil acts in this manner on the jack through the conduit 61, said jack compresses the spring 46 until the force produced by the latter compensates the force resulting from the oil pressure, so that for every oil pressure a coresponding position of the lever 40 exists. Moreover, if at a given moment the pressure from the valve housing decreases, the spring 46 will then pump oil into the conduit means 60—61 and the oil will be able to escape towards the conduit 56 through the valve 55 which is normally closed by the supply pressure.

As can be seen in FIG. 2, between the conduits 60 and 61, on the one hand, and conduits 62 and 63, on the other hand, are provided two three way valves 64 and 65, respectively, simultaneously operated by a single control and adapted, when one acts upon said control, to connect the conduit 60 with a conduit 61a acting upon the other face of the piston of the jack, and to connect the conduit 63 with a conduit 62a adapted to cause the oil to flow back. In such case, the operation is the same as previously described, but the jack compresses the spring 49, which corresponds to the vehicle reverse.

Figure 3:
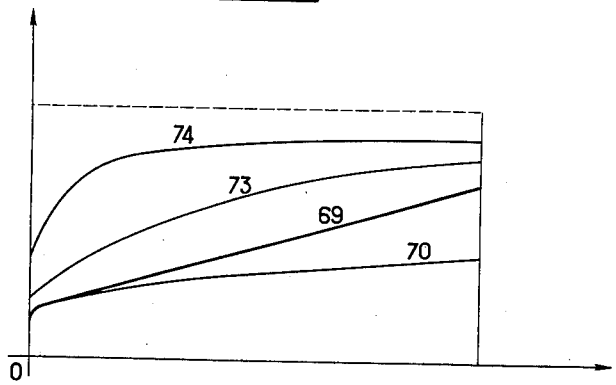
FIGS. 3 and 4 show a group of curves which allow to understand the operation.

The aforementioned valve 57 is operated by a rod 66 pivoted on the lever 40 at a point 67 which may be displaced, for example by means of a "Bowden" control cable 68. If one disposes the pivot point 67 of the rod 66 at the location as shown in FIG. 2, the opening of the valve 57 will increase with the transmission ratio (preferably in proportion to the square root of said ratio). Under such conditions, the servoing law is nearly linear. In FIG. 3 there is shown in ordinate the rotation speeds of the engine or of the shaft 7, and in abscissa the ratio between the speed of the element or shaft 12 and the speed of shaft 7, which ratio will be referred to here as transmission ratio of the variable speed transmission; said servoing results in a curve 69 which, of course, does not extend through the origin, due to the pressure different between the pump 51 and the conduit 60 admitted by the calibrated valve 54. Conversely, if one acts upon the "Bowden" control cable 68 so as to move the pivot point 67 nearer to the pin 39, the opening of the valve 57 will be less and less influenced by the transmission ratio and will tend to open at a lesser degree as the transmission ratio increases progressively, which augments the pressure and the transmission ratio. Servoing curves such as those shown at 70 in FIG. 3 are thus obtained and it can be seen that this leads to use of only low engine speeds.

As can be seen in FIG. 2, the aforementioned valve 59, which is mounted in parallel with the valve 57, is operated at will by either of two controls namely a foot pedal 71 and a linkage 72 connected to the hand brake control. These two actions, or either one or the other, cause the valve 59 to open progressively, thus to reduce the oil pressure, thus reducing the transmission ratio at the same engine speed or, which is the same, to augment the engine speed at the same oil pressure, thus at the same transmission ratio. In particular, when the foot pedal 71 is progressively depressed, the above-mentioned curve 69 is distorted by an increasing of the speeds of the engine at each transmission ratio and curves such as 73 and 74 are obtained.

All the foregoing relates to the servoing of the ratio of the transmissions. There remains, as mentioned previously, to servo the application pressure of the rollers 1 on the ring 9, so as to obtain the desired driving torque, but without any excess which could impair the output. To this end, as shown in FIG. 2, there is provided a second pump 75, also driven by the engine, which dervies some oil from a tank 52, which may be the same as the preceding one, and directs said oil into a valve housing 76. This housing comprises a valve 77 actuated by a piston 78 and retracted by an opposing spring 79. Said piston is supplied with oil by a conduit 80 leading from the preceding valve housing, and closes the valve 77 when the oil pressure supplied by the pump 51 exceeds the level as determined by the calibration of the spring 79 corresponding to the starting level. Said valve housing 76 feeds by a conduit 35, connected to the two conduits 35 in FIG. 1, both oil cups 30 and 31. Further, once the valve 77 is closed, the pressure in the conduit 35 is regulated by a valve 81 in proportion to the force tending to apply the latter against the seat thereof. Such force is the difference between two terms; one of which results from the compression of a spring 82 by a mechanism to be presently described, and the other results from the opposing compression of a spring 83 actuated by a centrifugal regulator 84 in proportion to the square of the engine speed. The spring 82 is compressed by means of a lever 85 pivotedly mounted at a fixed point 86 and the movement of which is caused by a roller 87. Said roller 87 is moved in a horizontal direction by the sliding displacement of a rod 88, which displacement is determined by the position of the lever 40 through a linkage schematically shown in FIG. 2 and bearing the reference number 89, and said displacement is proportional to the transmission ratio. Said linkage 89 acts upon the rod 88 through an effort limiting spring shown in the figure but not referenced, which comes into action when the roller abuts in the vicinity of the point 86. The position of roller 87 is in the neighborhood of the point 86 when the lever 40 is in neutral position (transmission ratio zero); it can be seen easily that the vertical displacement of a roller 90 mounted at the end of the lever 85 is inversely proportional to horizontal displacement of the roller 87, and hence to the transmission ratio.

On the other hand, the roller 87 is moved vertically by a member 91 which is at right angles to a rod 92 adapted to slide vertically and actuated by means of spring 93 with the aid of a cam 94, the rotation of which is controlled by the engine running. Moreover, the shaft thereof is vertically moved by the accelerator pedal 95. Said cam 94 is shaped so that the force transferred by the spring 93 to the roller 87 is proportional to the actual torque supplied by the engine.

It can be seen that, finally, the displacement of the roller 90, thus the vertical force supplied by the spring 82 is proportional to the product of the output torque of the engine by the reciprocal of the transmission ratio. If we consider now the whole of the effect of the two springs 82 and 83 upon the valve 81, we see that finally the pressure in conduit 35 is the difference between the term proportional to the output torque of the engine divided by the transmission ratio and another term which is proportional to the square of the engine speed, that is to the centrifugal force.

Figure 4:
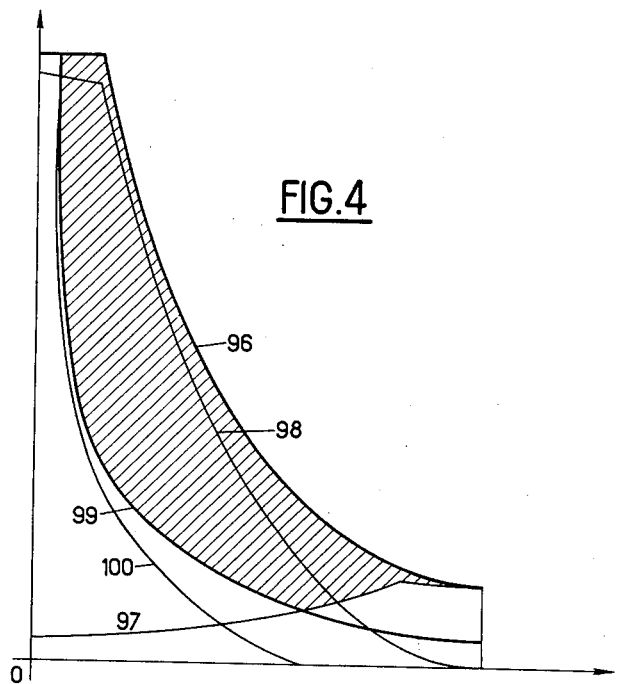

For a better understanding of this device, there has been plotted in FIG. 4, against the value of the transmission ratio, the curve 96 which represents the application of the radial force of rollers 1 upon the ring 9, in the case when the engine throttle is completely open. Of course, the lower the transmission ratio, the higher the torque transmitted by the rollers 1 to the ring 9.

According to what has been said at the beginning of this description, in the absence of correction made by the cups 30 and 31, the application of the radial force of the rollers 1 upon the ring 9 is the sum of several terms, of which one results from the action of the levers 16 since, as pointed out at the beginning, the adjustment of the levers 16 by screws 22, in order to cause the rollers 2 to apply a force upon the roller 6 and the ring 5, can be obtained solely through the reaction of the ring 9 upon the rollers 1. Then, the corresponding force is constant. On the other hand, as long as springs 26 oppose the action of the centrifugal weights 23, a second of said terms, caused by the action of the centrifugal force upon the rollers 1, is added to the first term. And, when the centrifugal force exceeds the level as determined by springs 26, the action of the centrifugal weights compensates exactly the centrifugal effect, but the strength of the springs 26 produces a constant difference between these two effects. Finally, the resultant of said three terms is represented by the curve 97 in FIG. 4.

If the curve 96 is considered as the radial force applied by the rollers 1 upon the ring 9 which one desires to obtain, and if the curve 97 is considered as the radial force normally obtained without the action of the oil cups, it is clear that the latter should be as far as possible the difference between the ordinates represented by these two curves; this results in a curve 98.

If instead of considering an entirely open throttle condition, we consider now said throttle in a completely closed condition, the engine yielding then a braking torque which is a portion of its normal torque, then the curve of the radial forces applied by the rollers 1 upon the ring 9, so as to use such engine braking, is that shown in FIG. 4 by the reference 99. Here again, the force or effort normally obtained is represented by the curve 97 and the effort required from the cups 30—31 is the difference, as represented by the curve 100, between the ordinates of the curves 99 and 97.

For each intermediary position of the throttle opening, the vertical movement of the shaft of the cam 94 (in FIG. 2) will take into account the torque actually supplied by the engine, and the aforementioned device will build up in the conduit 35 a pressure which, as previously mentioned, will be the difference between the actual torque divided by the transmission ratio (term corresponding to the application effort desired for the rollers 1) and a term proportional to the centrifugal force except for a constant and corresponding to the configuration of the curve 97 (torque obtained in the absence of the oil cups). Thus, the oil pressure in conduit 35 produces exactly the desired balance of the application force which may be represented by a curve which will always be within the boundaries of the shadowed portion in FIG. 4.

Now, there can be considered the operation of the vehicle equipped with the device according to this invention: as long as the engine rotates at a running lower than that established for starting the vehicle, the pump 51 discharging through the valve 57 supplies an insufficient pressure to open the valve 54, no pressure exists in the conduit 60, and the lever 40 is retracted to neutral position by the springs 46 and 49. Further, the pressure in conduit 80 is also insufficient to close the valve 77 and, thus, the conduit 35 receives no pressure.

To cause the engine to rotate throughout its speed range without moving the lever 40 away from the neutral position and without any pressure supplied by the conduit 35 to the cups 30—31, it is only necessary to engage completely the hand brake, which results in opening the valve 59. Under such conditions, the pressure supplied by the pump 51 will never exceed the level corresponding to the starting, and the valve 54 will remain closed while the valve 77 will remain open. In order to start, it is then necessary to release the hand brake and further to accelerate, which thus on the one hand closes the valve 59 and on the other hand increases the engine speed and thus increases the discharge pressure of the pump 51 supplying through the valve 57 alone. The pressure upon piston 78 becomes higher than that as determined by the calibration of the spring 79 and closes the valve 77; through the conduit 35 the cups 30—31 are then subjected to a pressure to obtain the necessary application force of the rollers 1 upon the ring 9. At the same time the pressure builds up to a value sufficient to push back the valve 60 and is led by the conduits 60—61 to the jack 41 which moves the lever 40, so as to set the transmission in forward drive at a progressively increasing speed which is a function of the engine speed (curve 69).

If one acts upon the common control of the valves 64 and 65, there is obtained the reverse drive in the same manner.

If one acts upon the control 68, so as to bring the pivot point 67, of the rod 66, to the oscillation center 39 of the lever 40, the servoing curve of the transmission ratio against the engine speed is then the curve 70. Under such conditions, the engine rotates most of the time at a low speed, which results in a fuel saving. Of course, the control 68 leads from a handle located within the reach of the driver and all intermediate adjustments are possible.

On the contrary, if the driver depresses the pedal 71, which may be mounted at the place usually provided for the clutch pedal, the servoing curves will be progressively distorted, as previously mentioned, such as those designated by 73 and 74. As pointed out previously here, this corresponds to an increase of the engine speed for the same speed of the vehicle, thus to a power increase, either of acceleration or engine braking. Using said pedal allows thus a sporting drive.

What I claim is:

1. In a variable speed transmission of the type comprising an input shaft, a fixed reaction ring, an output member, a planet carrier carrying a plurality of conical planet rollers positioned to be driven around said reaction ring by said input shaft and drive said output member, said planet rollers being sidably mounted on axes which are angularly disposed with respect to the main driving shaft of the transmission so as to be urged outward along their axes away from said drive shaft by centrifugal force when said transmission is running, means for counteracting said effect of centrifugal force on said planet rollers comprising at least one weighted lever pivotally mounted on said planet carrier so as to be swung by centrifugal force when said transmission is running, said lever being positioned to progressively urge said planet rollers slidably inward along their axes when said weighted portion of said pivoted lever is swung outward by centrifugal force, said lever being inwardly biased by resilient means applying an approximately constant force which prevents said lever from acting on said planet rollers until said drive shaft has attained a predetermined speed.

2. A variable speed transmission of the type comprising a driving shaft, a fixed reaction ring, an output member, a planet carrier mounted to turn freely on said shaft, a plurality of conical planet rollers mounted to be driven by said driving shaft around said reaction member and drive said output member, said planet rollers being mounted in said planet carrier for slidable movement along axes which are angularly disposed to said shaft, the angles between said axes and said shaft and between said axes and the generatrices of said planet rollers being equal, a cylindrical driven member rotatably mounted on said drive shaft and driven by said planet rollers and slidably movable along said planet rollers axially of said driving shaft to vary the transmission ratio of said transmission, and hydraulic means for urging said planet rollers outwardly from said drive shaft along their respective axes, and hydraulic means for urging said planet carrier along said drive shaft in a direction opposite to that in which the first mentioned hydraulic means urges the set of planet rollers.

3. A variable speed transmission as claimed in claim 2 in which said hydraulic means is supplied by a pump driven by a motor which drives said drive shaft, and said pump is connected to deliver hydraulic fluid to said hydraulic means at a pressure proportional to the output torque of the motor, and inversely proportional to the transmission ratio of the transmission, and inversely proportional to the square of the speed of rotation of the motor.

4. A variable speed transmission as claimed in claim 3 in which said pump is connected to said hydraulic means through a conduit the pressure in which is regulated by a valve responsive to movement of an accelerator for said motor, the axial displacement of said driven member, and the square of the speed of said motor.

5. A variable speed transmission as claimed in claim 2 comprising a lever connected to move said driven member axially along said planet wheels, a hydraulic cylinder connected to actuate said lever, a source of fluid and a pump connected between said source and one end of said cylinder to supply said fluid to said cylinder under a pressure dependent upon the speed of said pump, a first by-pass connected between the cylinder side of said pump and said source and a valve in said by-pass, and adjustable actuating means connecting said lever to said valve, so that movement of said lever simultaneously varies said transmission ratio and the ratio between the speed of said pump and said transmission ratio.

6. A variable speed transmission as claimed in claim 5 in which there is an additional by-pass connected between the cylinder side of said pump and said source, an additional valve in said additional by-pass, and additional lever means for actuating said additional valve.

7. A variable speed transmission as claimed in claim 6 which is driven by an engine and in which said hydraulic means is supplied with pressure fluid through a conduit the pressure in which is determined by the position of a third valve, said position being jointly controlled by linkage connecting said third valve and first mentioned lever, means for exerting a pressure proportional to the square of the speed of said engine, and means for exerting a pressure proportional to the torque supplied by said engine.

8. A variable speed transmission as claimed in claim 7 in which the position of said third valve is adjusted by an actuating rod, and said linkage, said means for exerting a pressure proportional to the square of the speed of said engine, and said means for exerting a pressure proportional to the torque supplied by said engine all act on said actuating rod through intermediate resilient means.

9. A variable speed transmission as claimed in claim 8 in which said linkage is connected to urge said third valve toward its open position with a force inversely proportional to the transmission ratio determined by the position of said first mentioned lever.

10. A variable speed transmission as claimed in claim 9 comprising a by-pass connecting said last-mentioned conduit to a low-pressure sump, and a valve in said by-pass, biased to open position, but connected to the cylinder side of said pump so as to be closed when the pressure delivered by said pump to said cylinder exceeds a predetermined figure.

11. A variable speed transmission as claimed in claim 10 in which said means for exerting a pressure proportional to the torque supplied by said engine comprises a cam which is angularly movable as a function of the speed of said engine and mounted for translational movement in response to movement of the engine throttle.

12. A variable speed transmission as claimed in claim 2 comprising a pivotally mounted arm for moving said driven member along said planet wheels, a hydraulic cylinder for actuating said arm, a source of fluid pressure, and a conduit connecting said source to said cylinder, and resiliently biased valve means in said conduit, said valve means being biased to open only when the pressure supplied thereto exceeds a predetermined figure.

13. A variable speed transmission of the type comprising a driving shaft, a planet carrier mounted to turn freely on said shaft, a fixed reaction ring, an output member, a plurality of conical planet rollers mounted to be driven by said driving shaft about said reaction ring and drive said output member, said planet rollers being mounted in said planet carrier for slidable movement along axes which are angularly disposed to said shaft, the angles between said axes and said shaft and between said axes and the generatrices of said planet rollers being equal, a cylindrical driven member rotatably mounted on said drive shaft and driven by said planet rollers and slidably movable along said planet rollers axially of said driving shaft to vary the transmission ratio of said transmission, and hydraulic means for urging said planet rollers outwardly from said drive shaft along their respective axes, said transmission being controlled by a lever connected to move said driven member axially along said planet wheels, a hydraulic cylinder connected to actuate said lever, a source of fluid and a pump connected between said source and one end of said cylinder to supply said fluid to said cylinder under a pressure dependent upon the speed of said pump, a first by-pass connected between the cylinder side of said pump and said source and a valve in said by-pass, adjustable actuating means connecting said lever to said valve, so that movement of said lever simultaneously varies said transmission ratio and the ratio between the speed of said pump and said transmission ratio, an additional by-pass connected between the cylinder side of said pump and said source, an additional valve in said by-pass, and additional lever means for actuating said additional valve, said additional lever means being connected to a hand brake and positioned to hold said additional valve open when said brake is engaged.

14. A transmission as claimed in claim 13 in which said additional lever is also connected to a pedal by means of which said additional valve may be opened even though said brake is disengaged.

References Cited in the file of this patent
UNITED STATES PATENTS

| | | |
|---|---|---|
| 888,265 | Ruland | May 19, 1908 |
| 2,208,340 | Parsons | July 16, 1940 |
| 2,238,801 | Schmitter | Apr. 15, 1941 |
| 2,315,067 | Madle | Mar. 30, 1943 |
| 2,349,981 | Mulder | May 30, 1944 |
| 2,357,222 | Parsons | Aug. 29, 1944 |
| 2,759,375 | Legros | Aug. 21, 1956 |
| 2,874,593 | Legros | Feb. 24, 1959 |
| 2,882,743 | Ebert | Apr. 21, 1959 |
| 2,929,273 | Weber | Mar. 22, 1960 |